US011379944B2

United States Patent
Fetterman et al.

(10) Patent No.: US 11,379,944 B2
(45) Date of Patent: Jul. 5, 2022

(54) TECHNIQUES FOR PERFORMING ACCELERATED POINT SAMPLING IN A TEXTURE PROCESSING PIPELINE

(71) Applicant: NVIDIA CORPORATION, Santa Clara, CA (US)

(72) Inventors: Michael Fetterman, Lancaster, MA (US); Shirish Gadre, Fremont, CA (US); Mark Gebhart, Round Rock, TX (US); Steven J. Heinrich, Madison, AL (US); Ramesh Jandhyala, West Lake Hills, TX (US); William Newhall, Woodside, CA (US); Omkar Paranjape, Austin, TX (US); Stefano Pescador, Dale, TX (US); Poorna Rao, Cedar Park, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 90 days.

(21) Appl. No.: 16/910,029

(22) Filed: Jun. 23, 2020

(65) Prior Publication Data

US 2021/0398241 A1 Dec. 23, 2021

(51) Int. Cl.
*G06T 1/20* (2006.01)
*G06T 1/60* (2006.01)
*G06F 16/245* (2019.01)

(52) U.S. Cl.
CPC .............. *G06T 1/20* (2013.01); *G06F 16/245* (2019.01); *G06T 1/60* (2013.01)

(58) Field of Classification Search
CPC ......... G06T 1/20; G06T 15/005; G06T 15/04; G06T 1/60; G06T 15/00; G06T 17/00; G06T 19/00
See application file for complete search history.

(56) References Cited

U.S. PATENT DOCUMENTS

| | | | | |
|---|---|---|---|---|
| 6,522,337 | B1 * | 2/2003 | Morioka | G06T 15/04 345/582 |
| 6,987,517 | B1 * | 1/2006 | Donovan | G06T 15/005 345/552 |
| 2005/0264579 | A1 * | 12/2005 | Malka | G06T 15/04 345/582 |

(Continued)

OTHER PUBLICATIONS

AMD, "RDNA Architecture", https://gpuopen.com/wp-content/uploads/2019/08/RDNA_Architecture_public.pdf, 55 pages.

*Primary Examiner* — Hau H Nguyen
(74) *Attorney, Agent, or Firm* — Artegis Law Group, LLP

(57) ABSTRACT

A texture processing pipeline in a graphics processing unit generates the surface appearance for objects in a computer-generated scene. This texture processing pipeline determines, at multiple stages within the texture processing pipeline, whether texture operations and texture loads may be processed at an accelerated rate. At each stage that includes a decision point, the texture processing pipeline assumes that the current texture operation or texture load can be accelerated unless specific, known information indicates that the texture operation or texture load cannot be accelerated. As a result, the texture processing pipeline increases the number of texture operations and texture loads that are accelerated relative to the number of texture operations and texture loads that are not accelerated.

20 Claims, 6 Drawing Sheets

(56) References Cited

U.S. PATENT DOCUMENTS

2012/0303900 A1\* 11/2012 Engh-Halstvedt .... G06F 3/0238
                                                    711/125
2020/0184703 A1\* 6/2020 Giliberto .................. G06T 1/20

\* cited by examiner

TECHNIQUES FOR PERFORMING ACCELERATED POINT SAMPLING IN A TEXTURE PROCESSING PIPELINE

FIELD OF THE VARIOUS EMBODIMENTS

Various embodiments relate generally to parallel processing architectures, more specifically, to techniques for performing accelerated point sampling in a texture processing pipeline.

DESCRIPTION OF THE RELATED ART

Graphics processing units (GPUs) are employed to generate three-dimensional (3D) graphics objects and two-dimensional (2D) graphics objects for a variety of applications, including feature films, computer games, virtual reality (VR) and augmented reality (AR) experiences, mechanical design, and/or the like. A modern GPU includes texture processing hardware to generate the surface appearance, referred to herein as the "surface texture," for 3D objects in a 3D graphics scene. The texture processing hardware applies the surface appearance to a 3D object by "wrapping" the appropriate surface texture around the 3D object. This process of generating and applying surface textures to 3D objects results in a highly realistic appearance for those 3D objects in the 3D graphics scene.

The texture processing hardware is configured to perform a variety of texture-related instructions, including texture operations and texture loads. The texture processing hardware generates accesses texture information by generating memory references, referred to herein as "queries," to a texture memory. The texture processing hardware retrieves surface texture information from the texture memory under varying circumstances, such as while rendering object surfaces in a 3D graphics scene for display on a display device, while rendering 2D graphics scene, or during compute operations.

Surface texture information includes texture elements (referred to herein as "texels") used to texture or shade object surfaces in a 3D graphics scene. The texture processing hardware and associated texture cache are optimized for efficient, high throughput read-only access to support the high demand for texture information during graphics rendering, with little or no support for write operations. Further, the texture processing hardware includes specialized functional units to perform various texture operations, such as level of detail (LOD) computation, texture sampling, and texture filtering.

In general, a texture operation involves querying multiple texels around a particular point of interest in 3D space, and then performing various filtering and interpolation operations to determine a final color at the point of interest. By contrast, a texture load typically queries a single texel, and returns that directly to the user application for further processing. Because filtering and interpolating operations typically involve querying four or more texels per processing thread, the texture processing hardware is conventionally built to accommodate generating multiple queries per thread. For example, the texture processing hardware could be built to accommodate up to four texture memory queries in a single memory cycle. In that manner, the texture processing hardware is able to query and receive most or all of the needed texture information in one memory cycle.

One drawback with this approach for querying texture memory is that, when the texture processing hardware is used for texture loads, only one of the four possible texture memory queries is performed in a single memory cycle. As a result, only one-fourth of the memory access capability of the texture processing hardware is utilized during texture loads. In addition, certain texture operations, referred to herein as point sampled texture operations, only need to perform one or two texture memory queries in given memory cycle, thereby utilizing only one-fourth to one-half of the memory access capability of the texture processing hardware. Such underutilization of the texture processing hardware leads to reduced efficiency and performance when the GPU is performing texture loads and point sampled texture operations.

As the foregoing illustrates, what is needed in the art are more effective techniques for querying texture information in a graphics processing unit.

SUMMARY

Various embodiments of the present disclosure set forth a computer-implemented method for accessing texture memory in a graphics processing unit. The method includes generating, at a first stage in a texture processing pipeline, a first determination that a texture memory query is eligible for acceleration within the texture processing pipeline. The method further includes causing, based on the first determination, the texture memory query to proceed to a second stage in the texture processing pipeline. The method further includes generating, at the second stage in the texture processing pipeline, a second determination that the texture memory query is eligible for acceleration within the texture processing pipeline. The method further includes processing the texture memory query within the texture processing pipeline based on at least one of the first determination and the second determination.

Other embodiments include, without limitation, a system that implements one or more aspects of the disclosed techniques, and one or more computer readable media including instructions for performing one or more aspects of the disclosed techniques.

At least one technical advantage of the disclosed techniques relative to the prior art is that, with the disclosed techniques, a greater percentage of texture memory access capability is utilized during texture loads and during simple texture operations. As a result, the efficiency and performance of the texture processing hardware is increased during texture loads and texture operations, relative to prior approaches. Another technical advantage of the disclosed techniques is that the texture processing hardware includes multiple stages for determining whether the memory access capability of the texture processing hardware could be utilized more efficiently. As a result, a greater number of texture loads and texture operations are able to take advantage of the disclosed techniques relative to an approach where this determination is made at only a single stage of the texture processing hardware. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive con

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
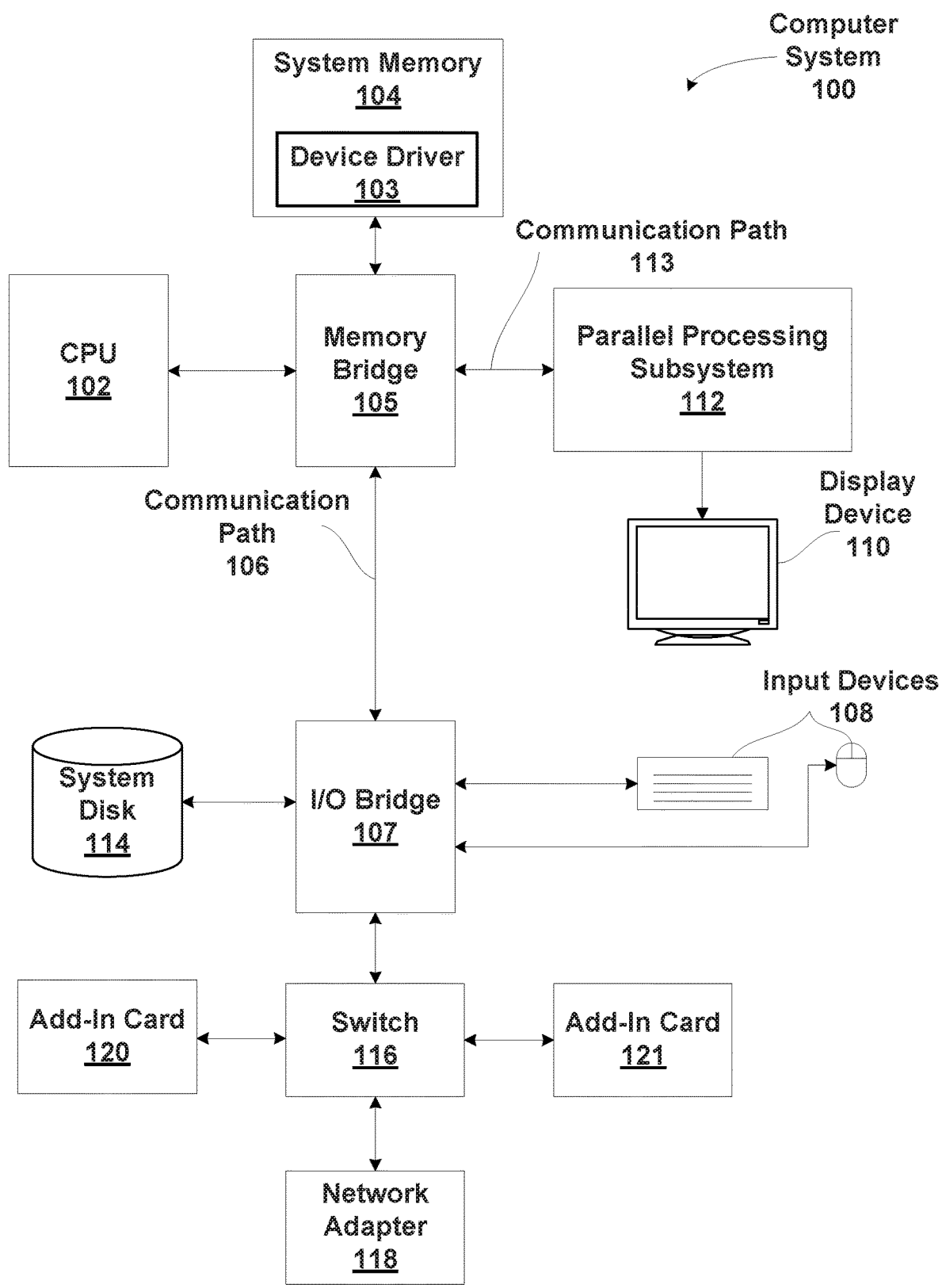
- FIG. 1 is a block diagram of a computer system configured to implement one or more aspects of the various embodiments.

FIG. 1 is a block diagram of a computer system 100 configured to implement one or more aspects of the various embodiments. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
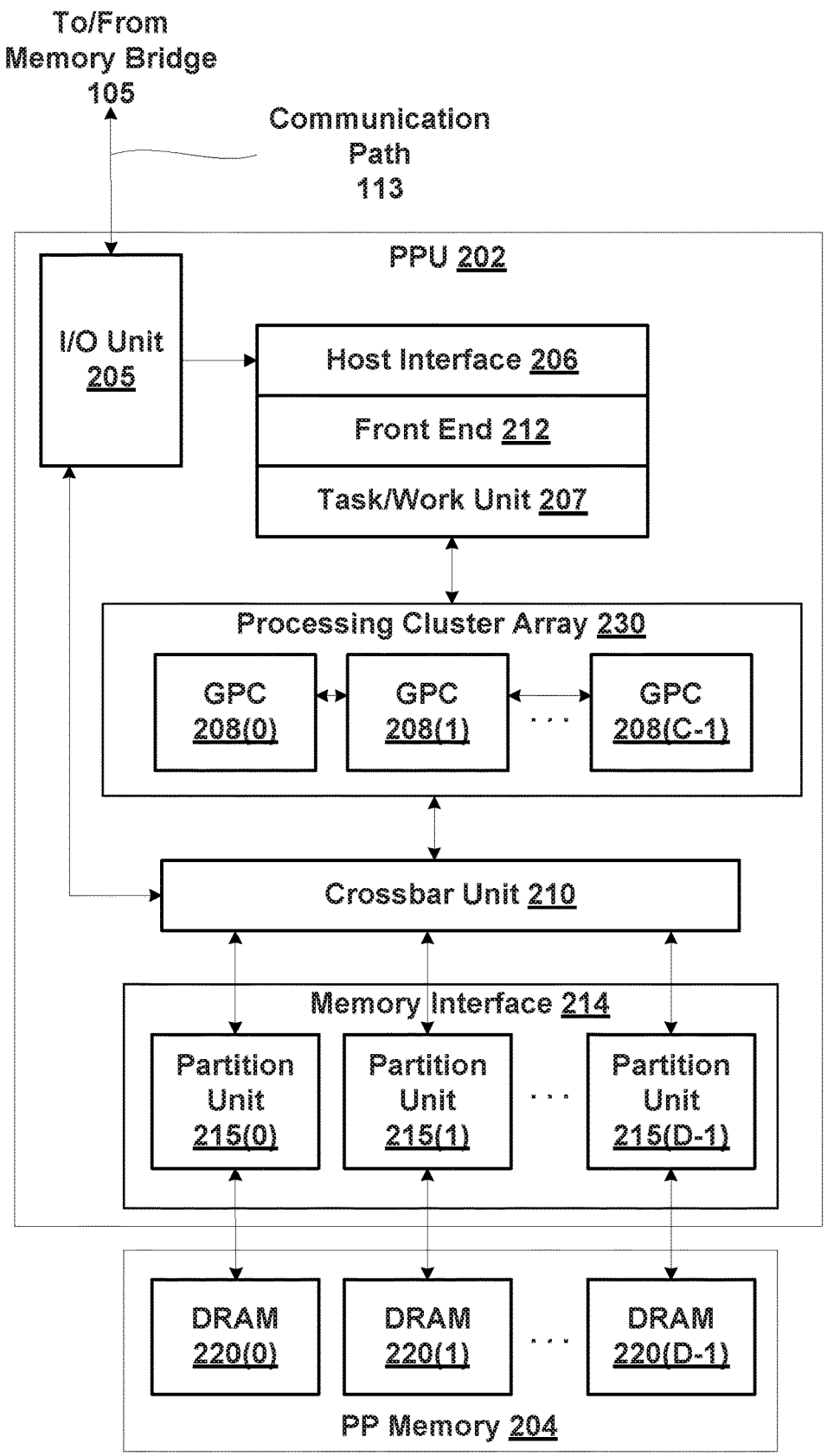
FIG. 2 is a block diagram of a parallel processing unit (PPU) included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
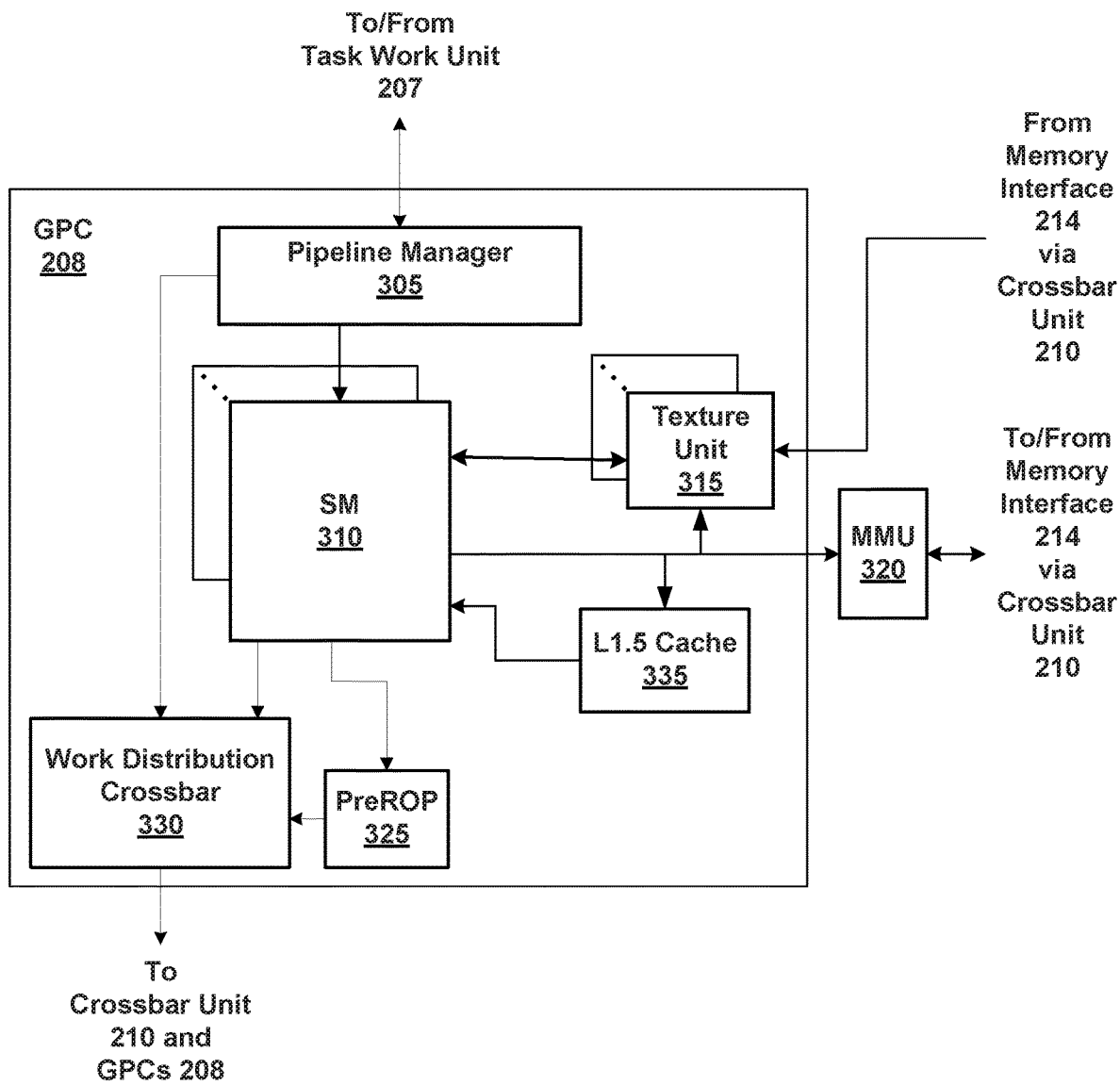
FIG. 3A is a block diagram of a general processing cluster included in the parallel processing unit of FIG. 2, according to various embodiments.

FIG. 3A is a block diagram of a general processing cluster 208 included in the parallel processing unit 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing, among other things, texture loads and texture operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present disclosure.

Graphics Pipeline Architecture

Figure 3B:
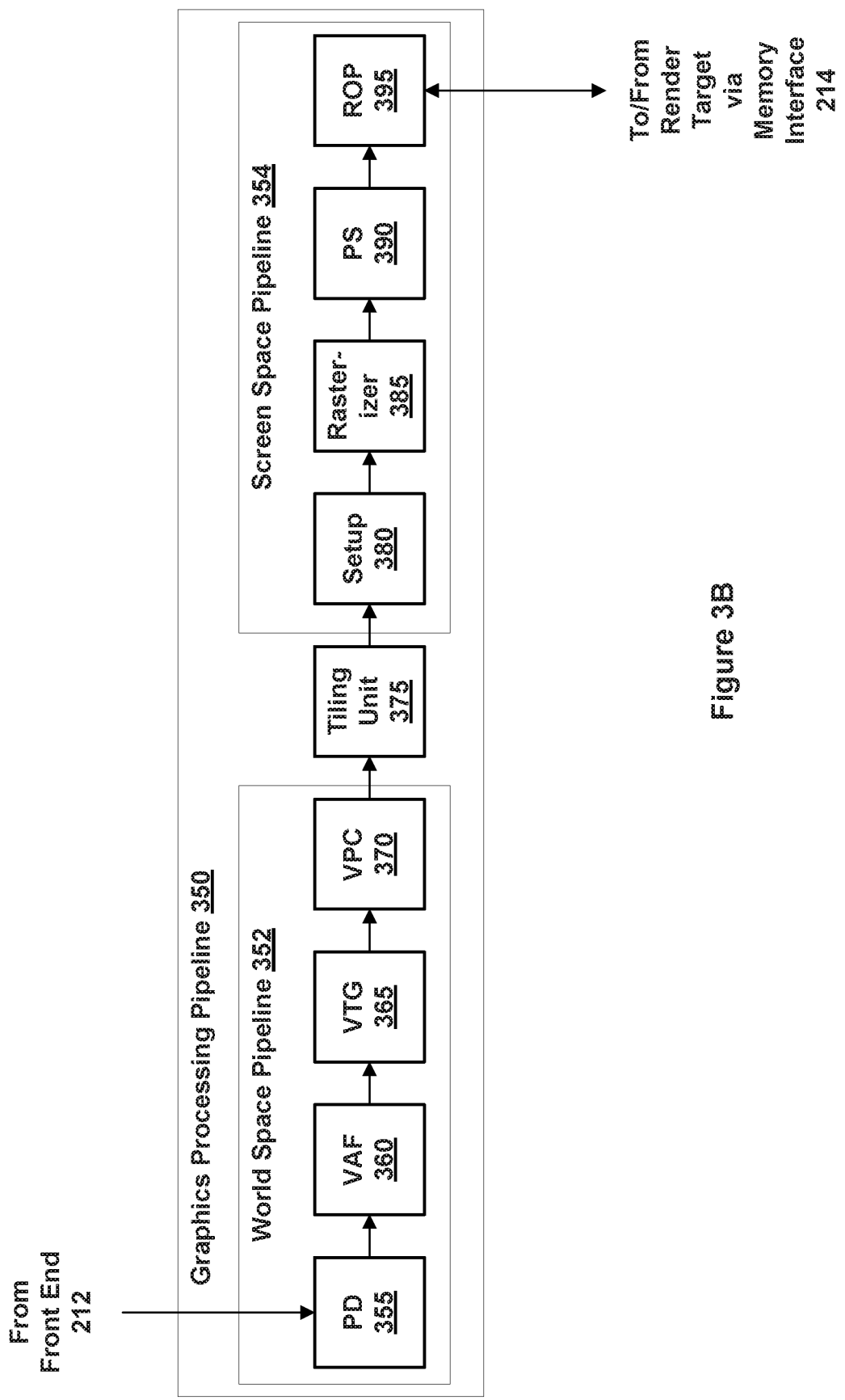
FIG. 3B is a conceptual diagram of a graphics processing pipeline that may be implemented within the parallel processing unit of FIG. 2, according to various embodiments.

FIG. 3B is a conceptual diagram of a graphics processing pipeline 350 that may be implemented within the parallel processing unit 202 of FIG. 2, according to various embodiments. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives, as well as color values, surface normal vectors, and transparency values at each vertex for the graphics primitives, for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit in the VTG 365 is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit in the VTG 365 is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit in the VTG 365 retrieves data and attributes for vertices and patches from shared memory. The task generation unit generates tasks for processing the vertices and patches for processing by later stages in the graphics processing pipeline 350. The task distributor in the VTG 365 redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit in the VTG 365 retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit in the VTG 365 is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit in the VTG 365 is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit in the VTG 365 transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline 350 may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Furthermore, images generated applying one or more of the techniques disclosed herein may be used to train, test, or certify deep neural networks (DNNs) used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Texture Memory Queries for Texture Operations and Texture Loads

Figure 4:
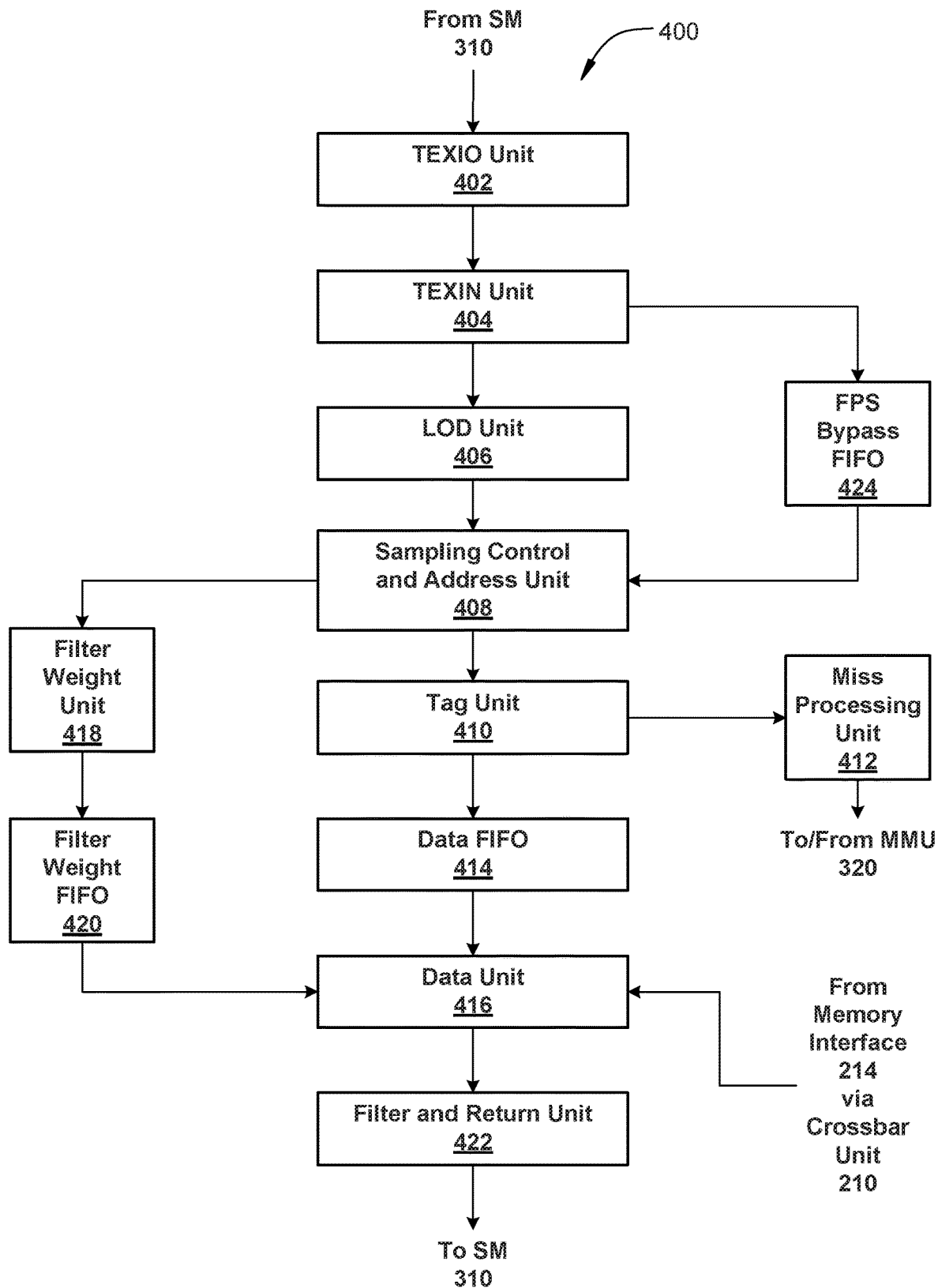
FIG. 4 is a conceptual diagram of a texture processing pipeline that a texture unit within the general processing cluster of FIG. 3A can be configured to implement, according to various embodiments.

FIG. 4 is a conceptual diagram of a texture processing pipeline 400 that a texture unit 315 within the general processing cluster 208 of FIG. 3A can be configured to implement, according to various embodiments. As shown, the texture processing pipeline 400 includes a texture input/output (TEXIO) unit 402, a texture input (TEXIN) unit 404, a level of detail (LOD) unit 406, a sampling control and address unit 408, a tag unit 410, a miss processing unit 412, a data first-in first-out memory (FIFO) 414, a data unit 416, a filter weight unit 418, a filter weight FIFO 420, a filter and return unit 422, and an accelerated point sampling (APS) bypass FIFO 424.

As described herein, a texture is a 2D picture or image made up of pixels and stored in a texture memory. A pixel that is included in a texture is referred to herein as a "texel." A texel also has a position or location that identifies where the texel is located in the texture. For example, a texel that is in the second column of the third row in a texture would have a location of (2,3). In a texture, the column number of a texel is referred to herein as the "u coordinate" and the row number of a texel is referred to herein as the "v coordinate." When the location is expressed as a pair of integer values, the location identifies a single texel in the texture. Application programs perform texture instructions that access one or more texels in texture memories. Such texture instructions include texture operations and texture loads, which are now described.

A texture operation performs calculations based on one or more pixels in a texture. In general, a texture operation includes floating point numbers to describe a position in a texture, such as (2.4, 3.6). A location expressed as a pair of floating point or other non-integer values is within the bounds of four texels. For example, a location of (2.4, 3.6) would be within the bounds of the four texels located at (2, 3), (3, 3), (2, 4), and (3, 4). As a result, a texture operation directed towards the location of (2.4, 3.6) would retrieve these four texels, perform a weighted average of the color value at the four texel locations, and then compute a final color based on the weighted average. In some embodiments, certain filtering functions may access more than four texels per thread. For example, 16× trilinear anisotropic filtering, may access up to 128 texels per thread. The weighted average may be any technically feasible operation, including, without limitation, bilinear interpolation, trilinear interpolation, and various filtering operations. An application program that performs a texture operation receives, in return, a single color value based on the weighted average of four texels.

By contrast, a texture load retrieves only a single texel value at an integer-addressed location in the texture memory, where an integer-addressed location is a texel that is identified by integer coordinates. In some embodiments, certain texture loads and point sampled texture operations may employ floating point coordinates, where the floating-point coordinates implicitly address four different nearby texels simultaneously. With texture loads and point sampled texture operations, the texture processing pipeline 400 performs no filtering operations. An application program may prefer to due texture loads rather than texture operations, such as when the application program performs a customized weighted averaging, interpolation, and filtering operations that are not supported by the built-in weighted averaging performed by the texture processing pipeline 400. Such an application program that performs four texture load operations directed towards the texels located at (2, 3), (3, 3), (2, 4), and (3, 4) receives, in return, the individual color values at those four texel locations. The application program can then perform any blending or combining operation on the four texels.

In general, the texture processing pipeline 400 is optimized to perform texture operations. When a particular thread performs a texture operation, the thread receives a color value based on the weighted average of the color values of four separate texels. Therefore, the texture processing pipeline 400 is optimized to simultaneously access up to four texels in a single memory access cycle via four separate memory ports. When a thread performs a texel load directed towards a single texel, the texture load accesses only one texel in a single memory cycle via a single memory port. As a result, the remaining three memory ports are unused. In order to access four texels via texture loads, four texture loads are performed sequentially, each texture load accessing a single memory port at a time. As a result, a single texture operation executes in approximately one-fourth the time as four texture loads. In addition, because texture loads do not perform weighted averaging to compute a final color, the portions of the texture processing pipeline 400 performs the weighted averaging are unused, leading to further inefficiencies.

In some embodiments, the texture processing pipeline 400 may accommodate multiple threads concurrently. For example, if the texture processing pipeline 400 is structured to support four concurrent threads, then the texture processing pipeline 400 has sixteen memory ports to support four threads performing four texture operations, each texture operation accessing four texels. If the four threads perform a texture load, then four of the memory ports are utilized to support the four texture loads, and the remaining twelve memory ports are unused. As a result, texture loads execute at four texel accesses per clock cycle, while texture operations execute at sixteen texel accesses per clock cycle.

As further described herein, texture loads for 'N' different threads may be combined in the texture processing pipeline 400 in order to improve utilization of texel accesses and, thereby, improve the performance of the texture processing pipeline during texture loads. In general, 'N' can be any number up to the number of threads in a warp. In some embodiments, if a warp-wide texture instruction is encoded with more than one texture load per thread, then 'N' may exceed the number of threads. In such embodiments, 'N' may be any number up to the number of texture loads encoded in a warp-wide texture instruction.

In addition, certain types of texture operations for 'N' different threads may be combined in the texture processing pipeline 400 in order to improve utilization of texel accesses and, thereby, improve the performance of the texture processing pipeline during these specific types of texture operations. These specific types of texture operations are referred to herein as point sampled texture operations. Point sampled texture operations are simple texture operations that request the texel that is nearest to a particular floating point location in the texture memory. For example, a point sampled texture operation directed towards the location (2.4, 3.6) could return the color of the texel located at (2, 4). In some embodiments, the texture processing pipeline 400 may be configured to improve the performance of texture gather operations, where each thread performs a point sampled load of one component from four surrounding texels. More specifically, a texture gather operations accesses four adjacent texture elements in a texture memory that are nearest to a location specified by the texture memory query. For example, a texture gather operation directed towards the location (2.4, 3.6) could perform a point sampled load of the red color component for the texels located at (2, 3), (2, 4), (3, 3), and (3, 4). As further described, the texture processing pipeline 400 may be configured to combine point sampled texture operations and/or texture gather operations for 'N' different threads in order to improve utilization of texel accesses.

If 'N'=2, then, the portion of the texture processing pipeline 400 configured to access up to four texel accesses for one thread can now access up to one texel for each of two threads simultaneously. If this portion of the texture processing pipeline 400 performs a texture load for two threads, then the texture processing pipeline 400 access two texels, one texel for each of the two threads. For example, if the texture processing pipeline 400 is structured to support four concurrent texture operations, then, when performing texture loads, eight of the memory ports are utilized to support eight texture loads for eight threads, and the remaining eight memory ports are unused. As a result, texture loads execute at eight texel accesses per clock cycle, while texture operations execute at sixteen texel accesses per clock cycle. In some embodiments, texels may be of multiple sizes. If texels are larger than the memory ports within the texture processing pipeline 400, then multiple memory ports may be employed for each texel. For example, if the texture processing pipeline 400 has 8-byte memory ports, and the texel size is 16-bytes per texel), then the texture processing pipeline 400 employs pairs of memory ports to support 8 threads/cycle texture loads, thereby fully consuming all 16 8-byte memory ports.

If 'N'=4, then, the portion of the texture processing pipeline 400 configured to access up to four texel accesses for one thread can now access up to one texel access for four threads. If this portion of the texture processing pipeline 400 performs a texture load for four threads, then the texture processing pipeline 400 access four texels, one texel for each of the four threads. For example, if the texture processing pipeline 400 is structured to support four concurrent texture operations, then, when performing texture loads, all sixteen of the memory ports are utilized to support sixteen texture loads for sixteen threads, and no memory ports are unused. As a result, texture loads execute at sixteen texel accesses per clock cycle, and texture operations also execute at sixteen texel accesses per clock cycle.

The stages of the texture processing pipeline 400 are now described.

In operation, the TEXIO unit 402 processes texture instructions, including texture loads and texture operations. The TEXIO unit 402 receives a texture instruction from the SM 310 for execution by the 32 threads in a warp. The TEXIO unit 402 splits the texture instruction into multiple portions, where each portion includes the texture instruction for a subset of the threads in the warp. The TEXIO unit 402 analyzes the texture instruction operation code, also referred to herein as an "opcode," as well as certain parameters and modifiers of the texture instruction, to make a first determination as to whether the texture instruction can execute at four threads per clock cycle or at some higher number of threads per clock cycle.

Initially, the TEXIO unit 402 assumes that the texture instruction can execute at a rate that is greater than four threads per clock cycle. Therefore, the TEXIO unit 402 retrieves the parameters of the texture instruction from a parameter queue (not shown) in a manner that can support that is greater than four threads per clock, such as, without limitation, an execution rate of eight threads per cycle. As a result, the parameter packing for a three-parameter texture instruction is different from the parameter packing for a four-parameter texture instruction. In the case of a four-parameter texture instruction, the texture instruction parameters are packed with four-parameter packing. If three-parameter texture instructions are also packed with four-parameter packing, the texture processing pipeline 400 may not be able to retrieve and process the parameters when executing at a rate of greater than four threads per clock cycle. However, parameter packing is more efficient when parameters are packed in groups of powers of two. Therefore, in the case of a three-parameter texture instruction, the texture instruction parameters are packed with one-parameter packing alternating with two parameter packing. In this manner, the parameters for a three-parameter texture instruction are compactly packed in groups of powers of two, and the texture processing pipeline can sustain an execution rate of greater than four threads per clock cycle.

If the TEXIO unit 402 determines that the texture instruction cannot be executed at a higher rate of execution than four threads per clock cycle, then the TEXIO unit 402, the stage "vetoes" the determination that the texture instruction can execute at the rate according to the current configuration. The TEXIO unit 402 then reconfigures the instruction to execute at a lower rate. For example, the TEXIO unit 402 could veto the configuration of a texture instruction executing at eight threads per clock cycle and reconfigure the texture instruction to execute at four threads per clock cycle.

If the TEXIO unit 402 determines that the texture instruction can only execute at four threads per clock cycle, then the TEXIO unit 402 splits the texture instruction into eight portions of four threads each, to execute at a rate of four threads per clock cycle. If the TEXIO unit 402 determines that the texture instruction can execute at a rate greater than four threads per clock cycle, such as with a texture load, then the TEXIO unit 402 splits the texture instruction into portions based on the value of 'N'. For example, if 'N'=2, then a texture instruction that can execute at a higher rate is split into four portions of eight threads each, and the texture instruction executes at a rate of eight threads per clock cycle. if 'N'=4, then the texture instruction is split into two portions of sixteen threads each, and the texture instruction executes at a rate of sixteen threads per clock cycle, and so on. For the purpose of the following discussion, 'N' is assumed to be 2. However, 'N' could be any technically feasible number.

In some cases, the TEXIO unit 402 may not be able to determine whether the texture instruction can execute at four threads per clock cycle or eight threads per clock cycle based on the opcode. In such cases, the TEXIO unit 402 makes the optimistic assumption that subsequent stages of the texture processing pipeline 400 is capable of supporting the higher texture instruction execution rate. Subsequently, any other stage of the texture processing pipeline 400 may determine that the texture instruction cannot execute at the current configuration. If a stage of the texture processing pipeline 400 determines that the texture instruction cannot execute at the currently configured rate, the stage vetoes the determination that the texture instruction can execute at the rate according to the current configuration. More specifically, when a given stage in texture processing pipeline 400 receives a texture instruction to execute in one clock cycle, but that stage needs multiple clock cycles to execute the texture instruction, the stage stalls the pipeline, splits the texture instruction into sub-pieces, and executes each sub-piece of the texture instruction in sequence. The stage reconfigures the texture instruction to execute at a lower rate. For example, a stage could veto the configuration of a texture instruction executing at eight threads per clock cycle and reconfigure the texture instruction to execute at four threads per clock cycle. As described herein, the TEXIN unit 404 is capable of vetoing the determination that the texture instruction can execute at the rate according to the current configuration. More generally, any technically feasible stage of the texture processing pipeline can veto the determination.

The TEXIN unit 404 receives split texture instructions from the TEXIO unit 402. The TEXIN unit 404 retrieves texture header state and texture sampler state from a memory based on a texture header index and a texture sampler index included in the texture instruction. The texture header state and texture sampler state are stored in a memory that is external to the texture processing pipeline 400. The TEXIN unit 404 stores the retrieved texture header state and texture sampler state in a local memory cache (not shown). Each stage in the texture processing pipeline 400 retrieves texture header state and texture sampler state as needed to perform the operations for that stage. Further, if a subsequent texture instruction includes the same texture header index and/or texture sampler index as a previous texture instruction, then the TEXIN unit 404 may access the texture header state and texture sampler state via the local memory cache. Accessing the texture header state and texture sampler state via the local memory cache avoids retrieving the texture header state and texture sampler state from external memory when the state is present in the local memory cache.

The texture header index is a pointer to a table of texture header state data that describes format of the texture in memory, including, without limitation, the location of the texture in memory, the dimensions of the texture, the number of color components per texel, the number of bits per color component, and whether the texture data is compressed. The sampler header index is a pointer to a table of texture sampler state data that describes how the texture is to be sampled and the type of filtering to apply to texels received from the texture.

The TEXIN unit 404 analyzes the texture header state and texture sampler state associated with the texture instruction to make a second determination as to whether the texture instruction can execute at eight threads per clock cycle or at four threads per clock cycle. If the TEXIN unit 404 determines that an incoming texture instruction configured to execute at eight threads per clock cycle can only execute at four threads per clock cycle, then the TEXIN unit 404 vetoes the configuration. The TEXIN unit 404 reconfigures the texture instruction to execute at four threads per clock cycle.

For example, the TEXIN unit 404 could determine, based on the texture sampler state, whether the texture instruction is a point sampled texture operation that requests the nearest texel. If the texture instruction is a point sampled texture operation, then the TEXIN unit 404 determines that the texture instruction can execute at eight threads per clock cycle. On the other hand, the TEXIN unit 404 may determine, based on the texture sampler state, that the texture instruction is associated with a more complex sampling or filtering operation. In such cases, the TEXIN unit 404 vetoes the texture instruction and reconfigures the instruction to execute at four threads per clock cycle. Similarly, if the texture header state data indicates that the texture instruction is directed towards a texture that includes compressed data, then the TEXIN unit 404 determines that the texture instruction can be executed at four threads per clock cycle.

Certain state data is a cross product of the texture instruction, the header state, and the sampler state. In such cases, the TEXIN unit 404 determines whether to veto a configuration of a texture instruction based on certain combinations of texture instruction, header state, and sampler state. The texture processing pipeline 400 maintains separate storage for the texture instruction, the header state, and the sampler state in order to properly access the textures. Maintaining this separate storage enables the TEXIN unit 404, and other stages of the texture processing pipeline 400, to make veto decisions based on such cross product state data.

If a texture instruction is neither a texture load nor a point sampled texture operation, then the TEXIN unit 404 transmits the instruction to the LOD unit 406 to execute at four threads per clock cycle. If the texture instruction is a texture load or a point sampled texture operation, the TEXIN unit 404 transmits the instruction to the APS bypass unit 424 to execute at 'N' X four threads per clock cycle. For example, if 'N'=2, then the TEXIN unit 404 transmits the instruction to the APS bypass unit 424 to execute at eight threads per clock cycle The LOD unit 406 is configured to compute a "level of detail" for the texture to be accessed from memory based on the position and orientation of a set of texel coordinates included within the texture instruction. Four threads, operating together, may execute texture instructions that include coordinates for four locations that define a geometric primitive, such as a quadrilateral, on a surface in a 3D graphics scene. The LOD unit 406 calculates a level detail and selects a corresponding texture from among a set of textures based on the distance of the four locations from one another. Each texture in the set of textures define the same texture image, but at different spatial resolutions or levels of detail. The LOD unit 406 selects the texture that, when the four locations are mapped to corresponding texel locations, minimizes the distance of the four texels from one another. After calculating the level of detail, the LOD unit 406 transmits the texture instruction to the sampling control and address unit 408.

The APS bypass FIFO 424 is a latency-matching FIFO to match the latency of the LOD unit 406. In some embodiments, some texture instructions executing within the texture processing pipeline 400 may employ the LOD unit 406, while other texture instructions executing within the texture processing pipeline 400, such as texture loads and point sampled texture operations, may not employ the LOD unit 406. Texture instructions that employ the LOD unit 406 pass through the LOD unit 406. Texture instructions that do not employ the LOD unit 406 do not pass through the LOD unit 406. If the LOD unit 406 is not currently processing any texture operation, and the TEXIN unit 404 transmits a texture instruction that does not employ the LOD unit 406, then the texture instruction bypasses the LOD unit 406. The texture instruction transits the APS bypass FIFO 424 with little to no delay and arrives at the sampling control and address unit 408. If the LOD unit 406 is currently processing any texture operation, and the TEXIN unit 404 transmits a texture instruction that does not employ the LOD unit 406, then the texture instruction bypasses the LOD unit 406. The texture instruction enters the APS bypass FIFO 424 and remains within the APS bypass FIFO 424 until the texture instruction processing through the LOD unit 406 arrives at the sampling control and address unit 408. Subsequently, the texture instruction within the APS bypass FIFO 424 arrives at the sampling control and address unit 408. In this manner, texture instructions processing through the LOD unit 406 and the APS bypass FIFO 424 remain in the original order.

In operation, the sampling control and address unit 408 receives texture instructions from the LOD unit 406 and the APS bypass FIFO 424. The stream of texture instructions from the LOD unit 406 are in order. Likewise, the stream of texture instructions from the APS bypass FIFO 424 are in order. However, a later texture instruction from the LOD unit 406 may arrive at the sampling control and address unit 408 before an earlier texture instruction from the APS bypass FIFO 424. Likewise, a later texture instruction from the APS bypass FIFO 424 may arrive at the sampling control and address unit 408 before an earlier texture instruction from the LOD unit 406. Because the sampling control and address unit 408 receives texture instructions from two different sources, the texture instructions may get out of order. Therefore, the sampling control and address unit 408 detects out of order texture instructions, and selects the texture instruction from the LOD unit 406 and the APS bypass FIFO 424 based on which texture instruction has an earlier time stamp. In this manner, the sampling control and address unit 408 sorts the streams of texture instructions from the LOD unit 406 and the APS bypass FIFO 424 into the correct order.as transmitted by the TEXIN unit 404.

The sampling control and address unit 408 performs various sampling and filtering operations for certain texture instructions. The sampling control and address unit 408 also provides information on how textures are sampled for certain texture instructions. The sampling control and address unit 408 also processes texture instructions with texel coordinates that extend beyond the boundaries of a given texture or that straddle the boundary between two textures. The sampling control and address unit 408 compares the texel coordinates with the size of the selected texture. If the texel coordinates are outside of the bounds of the selected texture, then the sampling control and address unit 408 performs one or more operations to process the out-of-bounds texel coordinates. The sampling control and address unit 408 may clamp or limit out-of-bounds coordinates to the bounds of the texture. Additionally or alternatively, the sampling control and address unit 408 may "wrap" out-of-bounds coordinates to the opposite side of the texture by performing a MOD operation on the out-of-bounds coordinates. Additionally or alternatively, the sampling control and address unit 408 may nullify or discard the texture operation that includes one or more out-of-bounds coordinates. In this manner, the sampling control and address unit 408 ensures that all texel coordinates are within the bounds of the relevant texture.

If the current texture operation is a texture load or a point sampled texture operation, these filtering operations are not performed. Instead, if the coordinates for the texture load or point sampled texture operation are in floating point format, the sampling control and address unit 408 converts the coordinates into integer texel coordinates. This conversion into a surface load instruction enables the texture load or point sampled texture operation to use existing circuitry for surface instructions that is already optimized to accommodate eight threads.

Further, the sampling control and address unit 408 performs various address computations based on the texel coordinates within the texture instruction and the level of detail to generate a tag. The tag corresponds to an entry in a tag table included within tag unit 410. The tag identifies a unique cache line in memory where the relevant texels are stored. In some embodiments, a cache line may consist of 128 bytes. An associated offset identifies the location of the first byte of the relevant texel within the cache line. In some embodiments, the tag is further associated with a value indicating the size of the relevant texel. In some embodiments, the tag may be formed based on the index of the texel, texture type, and the upper bits of the coordinates of all of the texels stored in the cache line. All texels in a particular cache line share certain upper bits of the texel coordinates, where those upper bits are used, in part, to form the tag. The sampling control and address unit 408 passes the texture instruction, address computation results, and sampling control information to the tag unit 410 and the filter weight unit 418. The sampling control and address unit 408 can generate up to 16 texel tag/offset/set identifier combinations per clock cycle in order to retrieve up to 16 texels concurrently.

The tag unit 410 receives up to 16 texel tag/offset/set identifier combinations per clock cycle from the sampling control and address unit 408 and, in turn, accesses up to 16 texels per clock cycle. The tag unit 410 includes a tag table that stores a set of texture header entries. Each texture header entry in the tag unit 410 represents a cache line within the data unit 416. The data unit 416 may represent a cache memory residing within the texture unit 315 or may represent any technically feasible cache memory associated with the SM 310. Upon receiving the memory access request and address computation results from the sampling control and address unit 408, the tag unit 410 determines whether the tag table includes a texture header entry corresponding to the texture data to be retrieved.

When the tag table includes an entry corresponding to the texture data to be accessed, a cache hit occurs, and the tag unit 410 determines that texture data to be accessed resides in the data unit 416. The tag unit 410 retrieves the entry by searching the tag table and retrieves a pointer to the data within the data unit 416 where the texture data actually resides. The tag unit 410 passes the offset to the data FIFO 414.

When the tag table does not include a texture header entry corresponding to the texture data to be accessed, a cache miss occurs, and the tag unit 410 causes the miss processing unit 412 to access the requested texture data from external memory.

The data FIFO 414, along with the filter weight FIFO 420, delays the information from the tag unit 410 to insert an appropriate delay. As a result, the data from the tag unit 410 and corresponding data from the filter weight unit 418 arrive at the data unit 416 at the same time.

The filter weight unit 418 prepares the per-texel weights for interpolating and/or filtering, the texel values in the filter and return unit 422.

The filter weight FIFO 420 delays the information from the filter weight unit 418 to match the delay through the tag unit 410, the data FIFO 414, and other associated stages of the texture processing pipeline 400. As a result, the data from the filter weight unit 418 and corresponding data from the tag unit 410 arrive at the data unit 416 at the same time.

The miss processing unit 412 accesses the requested texels by computing a virtual address based on data included within the texture instruction, the texture header, and the texel coordinates computed by the sampling control and address unit 408. The miss processing unit 412 then transmits a read request to read the requested data from a physical location. In various embodiments, the miss processing unit 512 may reside within the texture unit 315 or within the MMU 320 shown in FIG. 3A. The data unit 416 receives the texel data from external memory via the memory Interface 214 and crossbar unit 210. The data unit 416 updates the tag table within the tag unit 410 to reflect the newly-cached texels.

The data unit 416 receives a pointer to a cache line for one or more texels from the data FIFO 414. The data unit 416 also receives corresponding filter weight values, if any, from the filter weight FIFO 420. The data unit 416 retrieves the data associated with the one or more texels from cache memory. The data unit 416 passes the retrieved data and associated filter weight information to the filter and return unit 422. In certain cases, the data unit 416 may serialize the accesses to the texel data into multiple clock cycles in order to accommodate certain access constraints on the memory cache within the data unit 416. The data unit 416 collects and deserializes such texel data until all of the texel data needed to complete each individual request received from the data FIFO 414 is accumulated. In general, multiple requests received from the data FIFO 414 are performed in order to complete one warp-wide instruction. For example, if a warp instruction has 32 threads, and texture filtering operations process 4 threads at a time, 8 requests or more received from the data FIFO 414 are performed in order to complete a texture instruction. In addition, the texel data stored in the data unit 416 may be compressed via any technically feasible compression techniques. In such cases, the data unit 416 may decompress the texel data for further processing.

At this point, the data unit 416 now has the texel data needed to complete the portion of the texture instruction, wherein the portion of the texture instruction is referred to herein as a "wavefront." Texture instructions proceed through the texture processing pipeline 400 as a series of such wavefronts, where each wavefront processes 'M' threads per clock cycle. One wavefront is passed, per clock cycle, from stage to stage within the texture processing pipeline 400. Wavefronts for point sampled texture operations and texture loads may include 8 threads worth of data. Wavefronts for filtering texture operations may include data for up to 4 threads. For certain texture instructions, the texel data includes one texel for each thread, up to the number of available memory ports. For other certain texture instructions, the texel data includes four texels for each of up to 4 threads.

With traditional approaches, a texture instruction, including a texture load or a texture operation, returns the same amount of data per thread. For example, the current techniques could return up to four 32-bit data components for each of four threads over two clock cycles, for a total of four threads times 64 bits or 256 bits. With the disclosed techniques, a texture instruction could return up to a total of eight threads times 64 bits or 512 bits per clock cycle.

The filter and return unit 422 receives data and associated filter weight values from the data unit 416. The filter and return unit 422 applies one or more filters to the received data, including, without limitation, isotropic filters and anisotropic filters. The filter and return unit 422 computes the final color value for the various portions of the texture instruction, where each portion includes final color values for a portion of the 32 threads in the warp. For certain texture instructions, the filter and return unit 422 may compute four final color data values for four threads per clock cycle over eight clock cycles. For certain other texture instructions, the filter and return unit 422 may compute eight final color data values for eight threads per clock cycle over four clock cycles. The filter and return unit 422 further includes a bypass FIFO (not shown) that bypasses the filters and associated logic for texture loads and point sampled texture operations. The filter and return unit 422 assembles the final color data for each of the 32 threads in the warp. The filter and return unit 422 transmits the final color data for all 32 threads to the SM 310.

In general, the stages of the texture processing pipeline 400 execute at eight threads per cycle unless and until a particular stage does not have sufficient resources to execute the current texture instruction at that rate. The stage then vetoes the current configuration of the texture instruction and reconfigures the texture instruction to execute at four threads per cycle. As described herein, the TEXIO unit 402 generates vetoes based on the texture instruction opcode, along with associated instruction modifiers. The TEXIN unit 404 generates vetoes based on the texture instruction, the header state and the sampler state, either alone or in any combination. Various non-exclusive conditions that result in a veto are now described.

In one example, the TEXIO unit 402 could receive a texture instruction with an opcode that is ineligible to execute at more than four threads per clock cycle. As a result, the TEXIO unit 402 vetoes the configuration of the texture instruction.

In another example, the TEXIO unit 402 could receive a texture load and determine that the texture load may be eligible to execute at eight threads per clock cycle. Subsequently, the TEXIN unit 404 accesses the header state data and determines that the texture is made of texels that are each 96-bits wide. Because the texture processing pipeline 400 is not configured to retrieve and process 8 texels of 96-bits in one clock cycle, the TEXIN unit 404 vetoes the configuration of the texture load.

In yet another example, the TEXIO unit 402 could receive a texture operation and determine that the texture operation may be eligible to execute at eight threads per clock cycle if the texture operation performs nearest texel sampling. Subsequently, the TEXIN unit 404 accesses the sampler state data and determines whether the texture operation performs more complex sampling and/or filtering. Because the texture processing pipeline 400 is not configured to process 8 texels with complex sampling and/or filtering in one clock cycle, the TEXIN unit 404 vetoes the configuration of a texture operation that includes such complex sampling and/or filtering. If, on the other hand, the texture operation performs nearest texel sampling, then the texture operation is eligible to execute at eight threads per clock cycle, and the TEXIN unit 404 does not veto the configuration of the texture operation.

In yet another example, the TEXIO unit 402 could receive a texture operation and determine that the texture operation may be eligible to execute at eight threads per clock cycle. Subsequently, the TEXIN unit 404 accesses the header state data and determines that the texture operation is directed towards a texture that includes compressed texture data. Because the texture processing pipeline 400 is not configured to decompress and process 8 texels in one clock cycle, the TEXIN unit 404 vetoes the configuration of the texture operation.

In yet another example, the TEXIO unit 402 could receive a texture operation and determine that the texture operation may be eligible to execute at eight threads per clock cycle. Subsequently, the TEXIN unit 404 accesses the header state data and determines that the texture operation accesses the LOD unit 406, which is capable of only executing at four threads per clock cycle. The TEXIN unit 404 determines, from the header state data, the number of levels of detail included in the texture. If the texture includes multiple levels of detail, and the texture instruction specifies the computation of an LOD, then the TEXIN unit 404 vetoes the configuration of the texture operation and directs the texture operation towards the LOD unit 406. If, on the other hand, the texture includes only one level of detail, then there is no need to direct the texture operation towards the LOD unit 406 because there is no need to determine which level of detail to access. Therefore, the TEXIN unit 404 does not veto the configuration of the texture operation and directs the texture operation towards the APS bypass FIFO 424.

In yet another example, the TEXIO unit 402 could receive a texture operation and determine that the texture operation may be eligible to execute at eight threads per clock cycle.

Subsequently, the TEXIN unit 404 accesses the header state data and determines the addressing mode of the texture operation as determined by the sampling control and address unit 408. The addressing mode determines how to process texel addresses that the sampling control and address unit 408 determines are out of bounds of the texture. If the addressing mode of the texture operation is a simple addressing mode, such as clamp to the value of the nearest boundary texel, then the TEXIN unit 404 does not veto the configuration of the texture operation. If, on the other hand, the addressing mode of the texture operation is a more complex addressing mode that requires additional processing for out of bound texels, then the TEXIN unit 404 vetoes the configuration of the texture operation.

In yet another example, the TEXIO unit 402 could receive a texture operation and determine that the texture operation may be eligible to execute at eight threads per clock cycle. Subsequently, the TEXIN unit 404 accesses the header state data and determines that the texture operation is directed towards texels that are converted from one color space to another color space. Because the texture processing pipeline 400 is not configured to process and perform color space conversion on 8 texels in one clock cycle, the TEXIN unit 404 vetoes the configuration of the texture operation.

In yet another example, the TEXIO unit 402 could receive a texture operation and determine that the texture operation may be eligible to execute at eight threads per clock cycle. Subsequently, the TEXIN unit 404 accesses the header state data and determines that the texture operation generates final color values that need to be upconverted before returning the final color values to the SM 310. Because the texture processing pipeline 400 is not configured to process 8 texels and perform upconversion on the final color values in one clock cycle, the TEXIN unit 404 vetoes the configuration of the texture operation.

In another example, the TEXIO unit 402 could receive a texture gather operation and determine that the texture gather operation may be eligible to execute at eight threads per clock cycle. Subsequently, the TEXIN unit 404 accesses the header state data and determines that the particular texture gather operation is not able to execute at eight threads per clock cycle. For example, the texture components accessed by the texture gather operation could have a particular format and/or alignment that the texture processing pipeline 400 is not able to access at an accelerated speed. Therefore, the TEXIN unit 404 vetoes the configuration of the texture gather operation.

In yet another example, a stage of the texture processing pipeline 400, such as the sampling control and address unit 408, could determine that the texture instruction includes floating point texel coordinates which represent exact integer coordinates. The stage may determine that a texture instruction with such texel coordinates is eligible to execute at eight threads per clock cycle.

Figure 5:
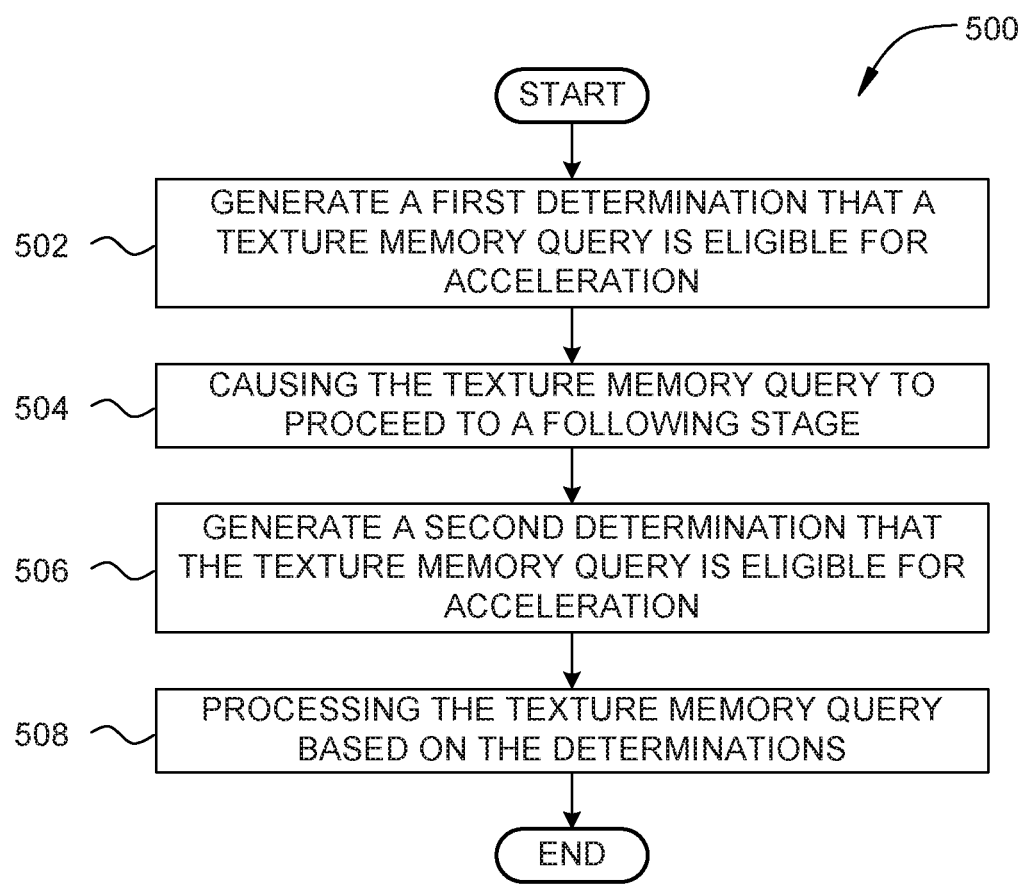
FIG. 5 is a flow diagram of method steps for performing memory access operations in a texture processing pipeline, according to various embodiments.

FIG. 5 is a flow diagram of method steps for performing memory access operations in a texture processing pipeline 400, according to various embodiments. Although the method steps are described in conjunction with the systems of FIGS. 1-4, persons of ordinary skill in the art will understand that any system configured to perform the method steps, in any order, is within the scope of the present disclosure.

As shown, a method 500 begins at step 502, where a first stage in a texture processing pipeline 400 generates a first determination that a texture memory query is eligible for acceleration. In some embodiments, the first stage comprises the TEXIO unit 402 of the texture processing pipeline 400 of FIG. 4. The TEXIO unit 402 processes texture instructions, including texture loads and texture operations. The TEXIO unit 402 receives a texture instruction from the SM 310 for execution by the 32 threads in a warp. The TEXIO unit 402 splits the texture instruction into multiple portions, where each portion includes the texture instruction for a subset of the threads in the warp. The TEXIO unit 402 analyzes the texture instruction opcode, as well as certain parameters and modifiers of the texture instruction, to make a first determination as to whether the texture instruction can execute at four threads per clock cycle or at some higher number of threads per clock cycle.

Initially, the TEXIO unit 402 assumes that the texture instruction can execute at a rate that is greater than four threads per clock cycle. If the TEXIO unit 402 determines that the texture instruction cannot be executed at a higher rate of execution than four threads per clock cycle, then the TEXIO unit 402, the stage "vetoes" the determination that the texture instruction can execute at the rate according to the current configuration. The TEXIO unit 402 then reconfigures the instruction to execute at a lower rate. For example, the TEXIO unit 402 could veto the configuration of a texture instruction executing at eight threads per clock cycle and reconfigure the texture instruction to execute at four threads per clock cycle.

If the TEXIO unit 402 determines that the texture instruction can only execute at four threads per clock cycle, then the TEXIO unit 402 splits the texture instruction into eight portions of four threads each, to execute at a rate of four threads per clock cycle. If the TEXIO unit 402 determines that the texture instruction can execute at a rate greater than four threads per clock cycle, such as with a texture load, then the TEXIO unit 402 splits the texture instruction into portions based on the value of 'N'. For example, if 'N'=2, then a texture instruction that can execute at a higher rate is split into four portions of eight threads each, and the texture instruction executes at a rate of eight threads per clock cycle. if 'N'=4, then the texture instruction is split into two portions of sixteen threads each, and the texture instruction executes at a rate of sixteen threads per clock cycle, and so on. For the purpose of the following discussion, 'N' is assumed to be 2. However, 'N' could be any technically feasible number.

In some cases, the TEXIO unit 402 may not be able to determine whether the texture instruction can execute at four threads per clock cycle or eight threads per clock cycle based on the opcode. In such cases, the TEXIO unit 402 splits the texture instruction into four portions of eight threads each and assumes that the texture instruction can execute at a rate of eight threads per clock cycle. Subsequently, any other stage of the texture processing pipeline 400 may determine that the texture instruction cannot execute at the current configuration. If a stage of the texture processing pipeline 400 determines that the texture instruction cannot execute at the currently configured rate, the stage vetoes the determination that the texture instruction can execute at the rate according to the current configuration. The stage reconfigures the instruction to execute at a lower rate. For example, a stage could veto the configuration of a texture instruction executing at eight threads per clock cycle and reconfigure the texture instruction to execute at four threads per clock cycle.

At step 504, the first stage of the texture processing pipeline causes the texture memory query to proceed to a following stage in the texture processing pipeline 400. At step 506, a second stage in the texture processing pipeline 400 generates a second determination that the texture memory query is eligible for acceleration. In some embodiments, the second stage comprises the TEXIN unit 404 of the texture processing pipeline 400 of FIG. 4.

The TEXIN unit 404 receives split texture instructions from the TEXIO unit 402. The TEXIN unit 404 retrieves texture header state and texture sampler state from a memory based on a texture header index and a texture sampler index included in the texture instruction. The texture header state and texture sampler state are stored in a memory that is external to the texture processing pipeline 400. The TEXIN unit 404 stores the retrieved texture header state and texture sampler state in a local memory cache. Each stage in the texture processing pipeline 400 retrieves texture header state and texture sampler state as needed to perform the operations for that stage. Further, if a subsequent texture instruction includes the same texture header index and/or texture sampler index as a previous texture instruction, then the TEXIN unit 404 may access the texture header state and texture sampler state via the local memory cache. Accessing the texture header state and texture sampler state via the local memory cache avoids retrieving the texture header state and texture sampler state from external memory when the state is present in the local memory cache.

The TEXIN unit 404 analyzes the texture header state and texture sampler state associated with the texture instruction to make a second determination as to whether the texture instruction can execute at eight threads per clock cycle or at four threads per clock cycle. If the TEXIN unit 404 determines that an incoming texture instruction configured to execute at eight threads per clock cycle can only execute at four threads per clock cycle, then the TEXIN unit 404 vetoes the configuration. The TEXIN unit 404 reconfigures the texture instruction to execute at four threads per clock cycle.

For example, the TEXIN unit 404 could determine, based on the texture sampler state, whether the texture instruction is a point sampled texture operation that requests the nearest texel. If the texture instruction is a point sampled texture operation, then the TEXIN unit 404 determines that the texture instruction can execute at eight threads per clock cycle. On the other hand, the TEXIN unit 404 may determine, based on the texture sampler state, that the texture instruction is associated with a more complex sampling or filtering operation. In such cases, the TEXIN unit 404 vetoes the texture instruction and reconfigures the instruction to execute at four threads per clock cycle. Similarly, if the texture header state data indicates that the texture instruction is directed towards a texture that includes compressed data, then the TEXIN unit 404 determines that the texture instruction can execute at four threads per clock cycle.

At step 508, one or more stages in the texture processing pipeline 400 process the texture memory query based on one or both of the first determination and the second determination. The method 500 then terminates.

In sum, various embodiments include a texture processing pipeline in a GPU that determines, at a first stage of the texture processing pipeline, whether texture operations and texture loads may be processed at an accelerated rate. The texture processing pipeline then reevaluates the decision at one or more additional stages of the texture processing pipeline. At each stage that includes a decision point, the texture processing pipeline assumes that the current texture operation or texture load can be accelerated unless specific, known information indicates that the texture operation or texture load cannot be accelerated. As the texture operation or texture load progresses to different stages, the texture processing pipeline acquires additional information regarding the texture operation or texture load. The texture processing pipeline determines, at multiple stages, whether texture operations and texture loads may be processed at an accelerated rate. As a result, the texture processing pipeline increases the number of texture operations and texture loads that are accelerated relative to the number of texture operations and texture loads that are not accelerated.

At least one technical advantage of the disclosed techniques relative to the prior art is that, with the disclosed techniques, a greater percentage of texture memory access capability is utilized during texture loads and during simple texture operations. As a result, the efficiency and performance of the texture processing hardware is increased during texture loads and texture operations, relative to prior approaches. Another technical advantage of the disclosed techniques is that the texture processing hardware includes multiple stages for determining whether the memory access capability of the texture processing hardware could be utilized more efficiently. As a result, a greater number of texture loads and texture operations are able to take advantage of the disclosed techniques relative to an approach where this determination is made at only a single stage of the texture processing hardware. These advantages represent one or more technological improvements over prior art approaches.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for accessing texture memory in a graphics processing unit, the method comprising:

generating, at a first stage in a texture processing pipeline based on a first set of data, a first determination of whether a texture memory query is eligible for acceleration within the texture processing pipeline;

configuring, based on the first determination, the texture processing pipeline to process the texture memory query at a first processing rate;

causing the texture memory query to proceed to a second stage in the texture processing pipeline;

generating, at the second stage in the texture processing pipeline and based on a second set of data, a second determination of whether the texture memory query is eligible for acceleration within the texture processing pipeline, wherein the second set of data differs from the first set of data; and reconfiguring, based on the second determination, the texture processing pipeline to process the texture memory query at a second processing rate.

2. The computer-implemented method of claim 1, wherein the texture memory query is associated with a texture instruction that comprises a texture load of a single texture element in a texture memory.

3. The computer-implemented method of claim 1, wherein the texture memory query is associated with a texture instruction that comprises a texture operation associated with a single texture element in a texture memory that is nearest to a location specified by the texture memory query.

4. The computer-implemented method of claim 1, wherein the texture memory query is associated with a texture memory instruction and the first determination is based on an operation code included in the texture memory instruction.

5. The computer-implemented method of claim 1, wherein the texture memory query is associated with a texture memory instruction and the first determination is based on an operation code that identifies the texture memory instruction as a texture load directed towards a single texture element in a texture memory, wherein the single texture element is located at a memory address specified by the texture memory query.

6. The computer-implemented method of claim 1, wherein the texture memory query is associated with a texture memory instruction and at least one of the first determination or the second determination is based on an operation code that identifies the texture memory instruction as a texture operation directed towards a single texture element in a texture memory, wherein the single texture element is nearest to a memory address specified by the texture memory query.

7. The computer-implemented method of claim 1, wherein the texture memory query is associated with a texture memory instruction and the second determination is based on one or more of header state data or sampler state data associated with the texture memory instruction.

8. One or more non-transitory computer-readable media storing program instructions that, when executed by one or more processors, cause the one or more processors to perform the steps of:
- generating, at a first stage in a texture processing pipeline based on a first set of data, a first determination of whether a texture memory query is eligible for acceleration within the texture processing pipeline;
- configuring, based on the first determination, the texture processing pipeline to process the texture memory query at a first processing rate;
- causing the texture memory query to proceed to a second stage in the texture processing pipeline;
- generating, at the second stage in the texture processing pipeline based on a second set of data, a second determination of whether the texture memory query is eligible for acceleration within the texture processing pipeline, wherein the second set of data differs from the first set of data; and
- reconfiguring, based on the second determination, the texture processing pipeline to process the texture memory query at a second processing rate.

9. The one or more non-transitory computer-readable media of claim 8, wherein the texture memory query is associated with a texture memory instruction and the first determination is based on an operation code included in the texture memory instruction.

10. The one or more non-transitory computer-readable media of claim 8, wherein the texture memory query is associated with a texture memory instruction and the first determination is based on an operation code that identifies the texture memory instruction as a texture load directed towards a single texture element in a texture memory, wherein the single texture element is located at a memory address specified by the texture memory query.

11. The one or more non-transitory computer-readable media of claim 8, wherein the texture memory query is associated with a texture memory instruction and at least one of the first determination or the second determination is based on an operation code that identifies the texture memory instruction as a texture operation directed towards a single texture element in a texture memory, wherein the single texture element is nearest to a memory address specified by the texture memory query.

12. The one or more non-transitory computer-readable media of claim 8, wherein the texture memory query is associated with a texture memory instruction and the second determination is based on one or more of header state data or sampler state data associated with the texture memory instruction.

13. The one or more non-transitory computer-readable media of claim 8, wherein the texture memory query is associated with a texture memory instruction and the second determination is based on a number of levels of detail included in a texture as specified by header state data.

14. The one or more non-transitory computer-readable media of claim 8, wherein the texture memory query is associated with a texture memory instruction and the second determination is based on a size of a texture element specified by header state data.

15. The one or more non-transitory computer-readable media of claim 8, wherein a texture memory instruction associated with the texture memory query executes at a first number of threads per clock cycle or at a second number of threads per clock cycle based on at least one of the first determination and the second determination.

16. A system, comprising:
- a memory storing instructions; and
- a processor that is coupled to the memory and, when executing the instructions:
  - generates, at a first stage in a texture processing pipeline based on a first set of data, a first determination of whether a texture memory query is eligible for acceleration within the texture processing pipeline;
  - configures, based on the first determination, the texture processing pipeline to process the texture memory query at a first processing rate;
  - causes the texture memory query to proceed to a second stage in the texture processing pipeline;
  - generates, at the second stage in the texture processing pipeline based on a second set of data, a second determination of whether the texture memory query is eligible for acceleration within the texture processing pipeline, wherein the second set of data differs from the first set of data; and
  - reconfigures, based on the second determination, the texture processing pipeline to process the texture memory query at a second processing rate.

17. The system of claim 16, wherein the texture memory query is associated with a texture instruction that comprises a texture load of a single texture element in a texture memory.

18. The system of claim 16, wherein the texture memory query is associated with a texture instruction that comprises a texture operation associated with a single texture element in a texture memory that is nearest to a location specified by the texture memory query.

19. The system of claim 16, wherein the texture memory query is associated with a texture gather operation that comprises a texture operation associated with four adjacent texture elements in a texture memory that are nearest to a location specified by the texture memory query.

20. The system of claim 16, wherein the texture memory query is associated with a texture memory instruction and the first determination is based on an operation code that identifies the texture memory instruction as a texture load directed towards a single texture element in a texture memory, wherein the single texture element is located at a memory address specified by the texture memory query.

* * * * *